United States Patent [19]

Nakazawa et al.

[11] Patent Number: 5,366,803
[45] Date of Patent: Nov. 22, 1994

[54] COATED METAL PLATE WITH EASILY CONTROLLED GLOSS AND REDUCED HEAT BLOCKING DURING LAMINATION

[75] Inventors: Tokuaki Nakazawa; Joseph J. Rudisi; Osamu Suzuki, all of Virginia Beach, Va.

[73] Assignee: Mitsubishi Kasei America, Inc., White Plains, N.Y.

[21] Appl. No.: 981,216

[22] Filed: Nov. 25, 1992

[51] Int. Cl.⁵ .............................................. B32B 15/08
[52] U.S. Cl. ................................... 428/335; 428/337; 428/409; 428/412; 428/421; 428/458; 428/461; 428/463
[58] Field of Search ............... 428/421, 422, 457, 458, 428/461, 463, 332, 334, 335, 336, 337, 215, 412; 427/409; 526/247, 249; 524/94, 520, 359

[56] References Cited

U.S. PATENT DOCUMENTS

| | | | |
|---|---|---|---|
| 3,169,120 | 2/1965 | Capron et al. | 260/29.6 |
| 3,324,069 | 6/1967 | Koblitz et al. | 260/31.4 |
| 3,340,222 | 9/1967 | Fang | 260/41 |
| 3,382,136 | 5/1968 | Bugel et al. | 161/165 |
| 3,616,019 | 10/1971 | Mueller-Tamm et al. | 156/244 |
| 4,141,873 | 2/1979 | Dohany | 428/421 |
| 4,313,996 | 2/1982 | Newman et al. | 428/215 |
| 4,314,004 | 2/1982 | Stoneberg | 428/421 |
| 4,345,057 | 8/1982 | Yamabe et al. | 526/247 |
| 4,508,425 | 4/1985 | Tanaka et al. | 350/641 |
| 4,521,265 | 6/1985 | Kunihiko et al. | 156/229 |
| 4,560,623 | 12/1985 | Iwata et al. | 428/626 |
| 4,594,292 | 6/1986 | Nagai et al. | 428/421 |
| 4,762,882 | 8/1988 | Okano et al. | 525/74 |
| 4,994,130 | 2/1991 | Ichikawa et al. | 156/164 |
| 5,130,365 | 7/1992 | Koishi et al. | 524/520 |
| 5,142,011 | 8/1992 | Shimizu et al. | 526/249 |
| 5,178,915 | 1/1993 | Moyle et al. | 428/421 |

Primary Examiner—Paul J. Thibodeau
Assistant Examiner—Stephen Sand
Attorney, Agent, or Firm—Oblon, Spivak, McClelland, Maier & Neustadt

[57] ABSTRACT

Metal sheets having a layer of a cured polyvinylidene fluoride paint on the metal surface and a layer of a cured fluorinated ethylene vinyl ether paint on the polyvinylidene fluoride paint exhibit excellent weathering properties, have a gloss of 25 to 80%, and may be bent to a sharp angle without cracking of the coating. Such sheets are particularly useful in the preparation of metal-resin composite laminates, because they do not experience thermal blocking during the lamination step.

21 Claims, 3 Drawing Sheets

COATED METAL PLATE WITH EASILY CONTROLLED GLOSS AND REDUCED HEAT BLOCKING DURING LAMINATION

BACKGROUND OF THE INVENTION

1. Field of the Invention

The present invention relates to a method of manufacturing a coated metal plate which results in the facile control of the gloss of the coating and prevents the phenomenon of heat blocking from the heat treatment during a lamination of the coated metal plate. The present invention also relates to the coated metal plates prepared by such a process and laminates comprising such coated metal plates.

2. Discussion of the Background

Various composite laminates are known wherein a metal sheet is laminated on a thermoplastic synthetic resin sheet. U.S. Pat. No. 4,508,425 discloses a mirror manufactured by plating chromium on one surface of a metal sheet bonded to a composite sheet, made up of a synthetic resin sheet and the metal sheet, to form a mirror surface. The mirror may be worked to a desired shape and may be formed with a decorative pattern.

U.S. Pat. No. 4,560,623 discloses a specular product of bronze-like tone particularly suitable for use as a decorative material. The specular product uses, as a substrate, a composite board comprising a synthetic resin sheet and metal sheets laminated thereon, and includes a nickel deposit plated on the metal sheet and a specular film of Sn-Ni alloy electroplated on the nickel deposit using a specific electroplating bath.

Such laminates are useful for a number of architectural applications, because the laminates combine light weight with high strength. These laminates may be used as finished surfaces for all or portions of the interior or exterior surfaces of a building.

It is also desirable to produce metal-resin composite laminates in a wide variety of colors and with a high degree of gloss. It is also desirable that such metal-resin composite laminates exhibit good weathering resistance and be able to be bent to a sharp angle without cracking of the coating on the exposed surface of the metal. However, when metal sheets are coated with conventional polyvinylidene fluoride (PVDF) paints, the coated plates exhibit a phenomenon known as heat blocking upon subsequent lamination with the resin layer. This heat blocking phenomenon seriously detracts from the aesthetic appeal of the finished plate. In addition, use of conventional PVDF paints results in coatings which have a gloss within a fairly narrow range, 25 to 35%.

Thus, there remains a need for coated metal sheets in a wide variety of colors and a wide range of gloss, which do not experience heat blocking on lamination and exhibit excellent weathering resistance. There also remains a need for laminates in a wide variety of colors and wide range of gloss, which can be bent to a sharp angle without cracking of the coating. There also remains a need for methods for preparing such metal sheets and such laminates.

SUMMARY OF THE INVENTION

Accordingly, it is one object of the present invention to provide a novel coated metal plate which is not subject to the blocking phenomenon during a lamination process.

It is another object of the present invention to provide a method for preparing a coated metal plate which is not subject to the blocking phenomenon during a lamination process.

It is another object of the present invention to provide a novel composite laminate which contains such a metal plate.

It is another object of the present invention to provide a novel coated metal plate which has a gloss ranging from 25 to 80%.

It is another object of the present invention to provide a method for preparing a coated metal plate which has a gloss ranging from 25 to 80%.

It is another object of the present invention to provide a composite laminate which contains a coated metal plate which has a gloss ranging from 25 to 80%.

It is another object of the present invention to provide a novel coated metal plate which may be bent to a sharp angle without cracking of the coating.

It is another object of the present invention to provide a method for preparing a coated metal plate which may be bent to a sharp angle without cracking of the coating.

It is another object of the present invention to provide a composite laminate which contains a coated metal plate and which may be bent to a sharp angle without cracking of the coating.

It is another object of the present invention to provide a novel coated metal plate which exhibits excellent weathering resistance.

It is another object of the present invention to provide a method for preparing a coated metal plate which exhibits excellent weathering resistance.

It is another object of the present invention to provide a composite laminate which contains a coated metal plate which exhibits excellent weathering resistance.

These and other objects, which will become apparent during the following detailed description, have been achieved by the inventors' discovery that a process involving forming a coat of a cured polyvinylidene fluoride (PVDF) paint on a surface of a metal plate followed by forming a coat of a cured fluorinated ethylene vinyl ether (FEVE) paint on the coat of the cured PVDF yields a coated metal plate which is not subject to the blocking phenomenon during a lamination process, has a gloss ranging from 25 to 80%, may be bent to a sharp angle without cracking of the paint, and exhibits excellent weathering resistance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
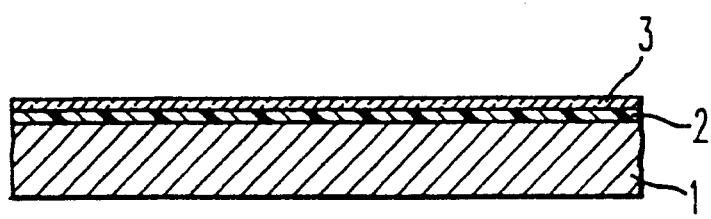
FIG. 1 provides a cross-sectional view of the coated metal sheet of the present invention.

Thus, in a first embodiment, the present invention relates to a coated metal plate comprising
(a) a metal substrate;
(b) a layer of a cured polyvinylidene fluoride paint, prepared by heat curing a paint comprising a polyvinylidene fluoride, a hardening agent, and a pigment, coated on a surface of the metal substrate; and
(c) a layer of a cured fluorinated ethylene vinyl ether paint, prepared by heat curing a paint comprising a fluorinated ethylene vinyl ether and a curing agent, coated on the layer of cured paint (b).

The metal plate may be formed of any of various metals such as aluminum, iron, copper, tin, steel, and the like. Aluminum and iron are preferred, and aluminum is particularly preferred. Although there is no particular constraint on the thickness of the metal plate, if the coated metal plate is to be used as a component in a composite laminate, it is preferred that the plate have a thickness of 0.01 to 2 mm, most preferably 0.1 to 0.8 mm.

In a preferred embodiment, the metal sheet, in particular aluminum sheet, is primed on one or more surfaces. On the surface which is to be coated with the PVDF paint, the metal sheet is primed with a polyester coating. Good results have been achieved using a polyester primer. If the metal sheet is to be used in a laminate with a resin core such as a polyolefin, then the surface of the metal sheet to be bonded to the resin core is preferably primed with an epoxy coating. Good results have been achieved using an epoxy primer.

The PVDF paint coated on the metal plate may be any of those described in U.S. Pat. Nos. 3,169,120, 3,324,069, 3,340,222 and 4,141,873, which are incorporated herein by reference. It is preferred to use a nonaqueous based system. These PVDF paints are known in the art as KYNAR-based paints. Such paint systems comprise a dispersion of solid high molecular weight polyvinylidene fluoride and a hardening agent such as acrylate polymer particles, polyester particles, polyurethane particles and epoxy particles, in addition to a pigment. The polyvinylidene fluoride contained in the PVDF paint used in the present invention contains repeating units having the structure:

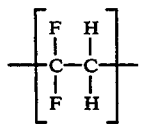

Suitable pigments include, for example, titanium dioxide, silica, iron oxides of various colors, lead titanate, and various silicates, for example, talc, diatomaceous earth, asbestos, mica, clay and basic lead silicate. Other inorganic pigments which can be used are illustrated as follows: zinc oxide, zinc sulfide, zirconium oxide, white lead, lithopone, carbon black, lead chromate, leafing and nonleafing metallic pigments, molybdate orange, calcium carbonate and barium sulfate. Organic pigments which are stable at the baking temperatures used can also be added to the composition. Especially good results are obtained when commercially available paints sold under the tradename of FLUROPON ® by Valspar of Garland, Tex. are used. Such paints are available in a wide range of colors.

Suitably, the thickness of the cured PVDF paint is 1 to 40 μm, preferably 15 to 25 μm. If the PVDF paint layer is less than 1 μm thick, then there may be insufficient pigment to achieve the desired degree of coloration. If the thickness of the PVDF paint layer is more than 40 μm, then the paint layer may crack on bending of the metal plate.

The FEVE paint (c) coated on the PVDF paint may be any of those disclosed in U.S. Pat. No. 4,345,057, which is incorporated herein by reference. Such paints contain (1) a copolymer of a fluoroolefin, cyclohexyl vinyl ether, and a hydroxyalkyl vinyl ether; (2) a curing agent such as a melamine resin, a urea resin, and a polybasic acid; and (3) a solvent such as hydrocarbons, alcohols, esters, ketones glycol ethers, and various commercial thinners. The copolymer of fluoroolefin, cyclohexyl vinyl ether, and hydroxyalkyl vinyl ether contained in the FEVE paint used in the present invention has the general structure shown below:

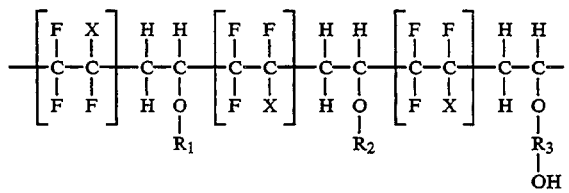

wherein X is Cl or F; $R_1$ and $R_2$ are independently $C_{2-8}$-alkyl or $C_6$-cycloalkyl; and $R_3$ is $C_{2-8}$-alkylene or $C_6$-cycloalkylene. The copolymer may also contain repeating units of the formula:

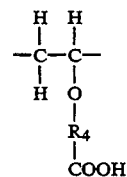

wherein $R_4$ is $C_{2-8}$-alkylene or $C_6$-cycloalkylene. Such paints are known in the art as Lumiflon paints, and good results have been achieved using commercially available paints sold under the tradename of BONNFLON ® manufactured by Asahi Glass Coat & Resin Co. Ltd. in Japan and tradename MEGAFLON ® manufactured by Keeler & Long, Inc. of Watertown, Conn.

Typically, the FEVE paint will not contain a pigment and will instead form a clear, colorless layer over the pigmented PVDF layer. However, some in some applications it may be desirable to include a pigment in the fluorinated ethylene vinyl ether layer, to achieve a desired effect, such as a pearl-like finish. In these cases, the fluorinated ethylene vinyl ether paint could contain any of those pigments given above.

Suitably, the thickness of the cured FEVE paint is 1 to 40 μm, preferably 12 to 25 μm. If the thickness of the FEVE coat is less than 1 μm then the good effects of the present invention, such as high gloss and reduced blocking, may not be achieved. If the thickness of the coat is greater than 40 μm then the coat may crack on bending of the coated metal plate.

The coated metal plate of the present invention may be prepared by forming a coat of the PVDF layer, curing the PVDF coating, forming a coat of FEVE on the cured PVDF layer, and then curing the FEVE coat. The coatings of the PVDF paint and the FEVE paint may be applied by any conventional technique, such as brushing, spraying, rolling, etc. It is preferred that both the PVDF and the FEVE coating be applied by die-roll coating.

After the PVDF coating has been applied to the metal plate, the PVDF paint is cured by baking at a temperature of 460° to 500° F. (peak metal temperature), preferably 470° to 490° F., for a time of 0.5 to 1.5 min., preferably 0.75 to 1.25 min. After, the PVDF layer has been cured and cooled and the FEVE coating has been coated on the cooled, cured PVDF layer, the FEVE coating is cured by baking at a temperature of 435° to 475° F. (peak metal temperature), preferably 445° to 465° F., for a time of 0.5 to 1.5 min., preferably 0.75 to 1.25 min.

Although the metal sheets coated with cured PVDF and cured FEVE according to the present invention may be used as a final product, for fabricating metal articles, more typically, the coated metal sheet of the present invention will be laminated with a resin layer to form a composite laminate.

Although it may sometimes be desirable to use only one metal sheet coated with PVDF and FEVE according to the present invention, the final laminate may also comprise a resin sandwiched between two metal sheets each of which having the surface not bonded to the resin core coated with PVDF and FEVE according to the present invention.

The resin core may be composed of any resin suitable for use in metal resin laminate plates. Such resins described in U.S. Pat. No. 4,994,130, which is incorporated herein by reference. It includes, for example, polyethylene, polypropylene, polybutene, polyvinyl chloride, polystyrene, polyamide, polyethylene terephthalate, polybutylene terephthalate and polycarbonate. From the viewpoint of the extrusion molding properties, it is preferred to employ a polyolefin synthetic resin such as polyethylene, polypropylene, or polybutene. As such a thermoplastic resin, not only a virgin material, but also a recovered material or reproduced material may be used in the form of a sheet. To such a thermoplastic resin, a foaming agent, a flame retardant, a filler, a coloring agent, etc. may be incorporated as the case requires. Good results have been achieved by using a low density polyethylene core. Preferably, the resin core should contain 0.05 to 0.4 wt. % of carbon black, preferably 0.1 to 0.3 wt. % of carbon black, based on the total weight of the resin core, to inhibit UV decomposition of the resin core.

It is particularly preferred that the metal sheet(s) be laminated with the resin core by means of an adhesive laminating film, disposed between the resin core and the metal sheet. Most preferably, the adhesive film is a modified polyolefin resin such as those described in U.S. Pat. No. 4,762,882, which is incorporated herein by reference.

Suitably, the resin core is 1 to 10 mm thick, preferably 2 to 5 mm thick. The adhesive film is suitably 10 to 100 μm thick, preferably 15 to 50 μm thick.

The laminate of the present invention may be prepared by extruding the resin core through a die to form a flat sheet and passing the extruded resin sheet through laminating rollers simultaneously with two metal sheets, one on each surface of the resin sheet. At least one and sometimes both of the metal sheets are coated according to the present invention. The metal sheets according to the present invention are oriented such that the PVDF and FEVE layers face away from the resin core.

Typically, the resin core is laminated at a temperature of 110° to 190° F., preferably 125° to 165° F. It is preferred to extrude the resin sheet to a thickness which is larger than the gap between the laminating rollers by about 10%. Preferably, the coated metal sheet is preheated to a temperature of 320° to 420° F., most preferably 330° to 400° F. before passing through the laminating rollers with the resin core. The lamination is suitably carried out at a temperature of 320° to 425° F. (roller-temperature), preferably 330° to 410° F. Suitably, the laminating pressure is 250 to 1100 psi, preferably 400 to 1000 psi.

In a preferred embodiment, the coated metal plate is laminated to the resin core by an adhesive film. In this case, a multilayered arrangement, in which the adhesive film is disposed between the metal sheet and the resin core, is forced through the laminating rollers.

In another preferred embodiment, the cured FEVE surface of the final laminate is covered with a protective film to prevent marring of the surface during stacking and shipping. Suitably, the protective film is any lightly adhesive film which will sufficiently protect the surface of the laminate and can be easily removed. Good results have been achieved with QUALITY COTE® produced by Main Tape of Union, N.J.

Referring now to the drawings, wherein like reference numerals designate identical or corresponding parts throughout the several views, FIG. 1 shows a cross-sectional view of a coated metal plate according to the present invention. The metal substrate (1) is coated with a cured layer of PVDF paint (2), which is in turn coated with a cured layer of FEVE coating (3).

Figure 2:
FIG. 2 provides a cross-sectional view of the metal-resin composite laminate of the present invention.

FIG. 2 shows a cross-sectional view of a metal-resin composite laminate of the present invention. The resin core (4) is sandwiched between two coated metal sheets according to the present invention each of which comprise a metal substrate (1), a cured layer of PVDF paint (2), and a cured layer of FEVE paint. The coated metal sheets are oriented such that the cured layers (2) and (3) face away from the resin core (4). Although the embodiment shown has two coated metal sheets of the present invention, it is to be understood that other embodiments will employ only one of the present coated metal sheets.

Figure 3:
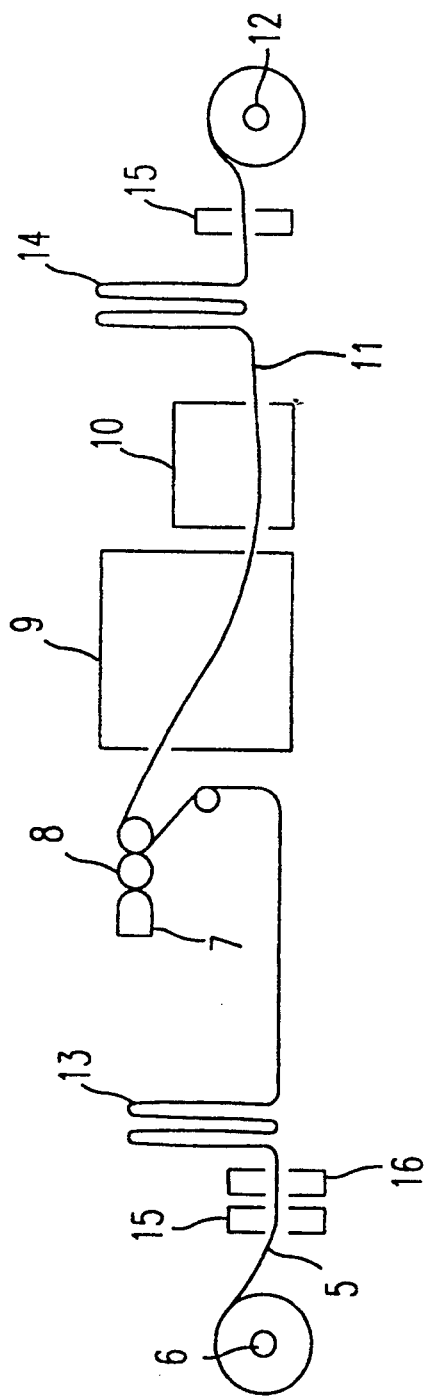
FIG. 3 illustrates an apparatus for forming the coated metal plates of the present invention.

FIG. 3 schematically illustrates an apparatus used for forming the coated metal sheet of the present invention. The structure and operation of the apparatus will be discussed in terms of the formation of the cured PVDF paint layer, although it is to be understood that the operation of the apparatus is essentially the same for the formation of the cured FEVE coating. The metal sheet (5) is uncoiled from a feed roll by means of an uncoiler (6) and the PVDF paint is applied by means of die-roll coating using a die (7) and roller (8). The PVDF paint is cured by baking in an oven (9) and cooled in a cooler (10). The cured and cooled coated (11) sheet is taken up on a product roll by means of a recoiler (12). The apparatus is equipped with an entrance accumulator (13) and an exit accumulator (14) as well as entrance and exit shears (15) and an entrance joiner (16) to facilitate removal and replacement of empty feed rolls and full product rolls.

Figure 4:
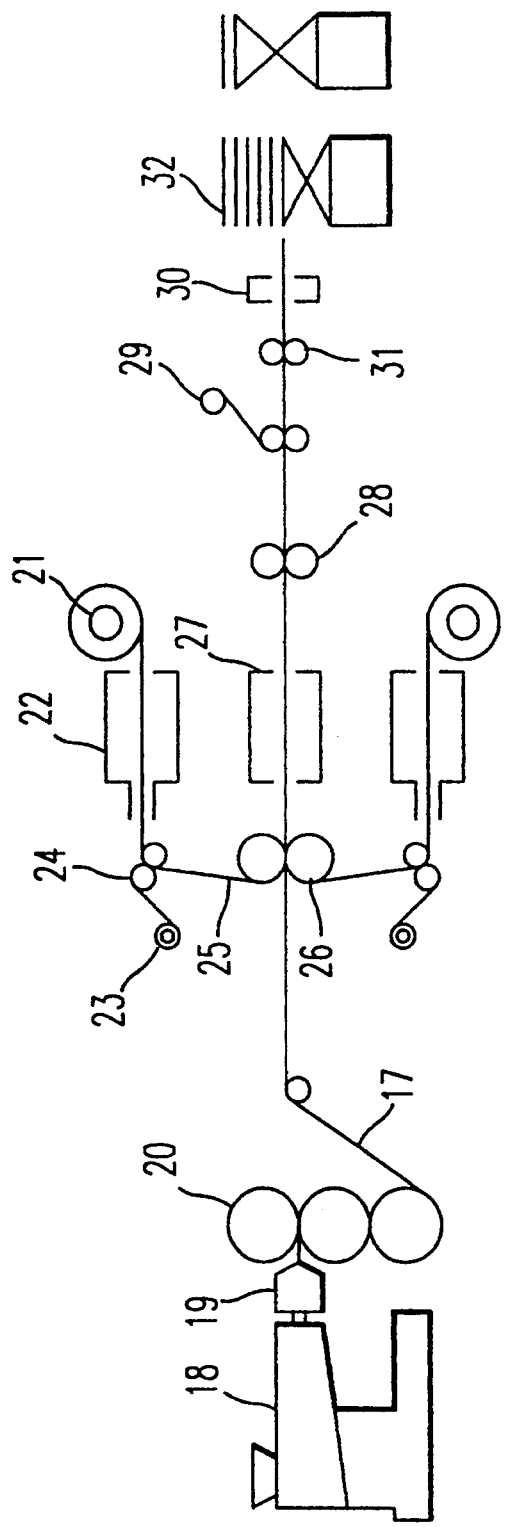
FIG. 4 illustrates an apparatus for forming composite laminates containing a coated metal plate according to the present invention.

FIG. 4 schematically illustrates an apparatus used for preparing the present metal-resin composite laminates. The structure and operation of the apparatus will be discussed in terms of forming a laminate in which the resin core is sandwiched between two coated metal sheets of the present invention. However, it is to be understood that either one of the present coated metal sheets may be omitted or replaced with any suitable replacement such as an uncoated metal sheet. The resin core (17) is extruded through an extruder (18) through a T-die (19) and passed through a sheeting three roll set (20). The coated metal sheet (11) is uncoiled from an uncoiler (21) and preheated in a preheater (22). The adhesive film (23) and the preheated coated metal sheet are passed through prelaminating rollers (24) to give a metal sheet-adhesive film composite (25). The metal sheet-adhesive film composite (25) and the extruded resin core (17) are then passed through the laminating rolls (26) and on through the cooler (27), by means of pulling rollers (28). An optional, protective film (29) may be applied downstream of the pulling rollers (28).

The shears (30) downstream of the pulling rollers (28) are for cutting the laminate to desired length and are preferably flying shears. The laminate may be cut to width by means of the slitter (or trimmer) (31). The finished product is collected on a piler (32).

As noted above, the coated metal sheets and metal-resin composite laminates of the present invention possess a number of desirable characteristics. First, because the pigment is contained in the PVDF paint layer, the metal sheets and laminates of the present invention exhibit the excellent weathering resistance characteristic of PVDF paints. Second, the present metal sheets and laminates may be bent to angles as sharp as 90° without cracking of the coatings. The metal sheets may be bent as is, and the laminates may be bent after scoring or cutting the metal sheet along the line of bending on the acute side of the bend. Third, because the exterior surface of both the present metal sheets and laminates is a cured FEVE paint, it is possible to achieve surfaces having a wide range of gloss, 25 to 80%, while only low values of gloss are attainable when the exterior surface is a cured PVDF paint.

Perhaps most importantly, the coated metal sheets of the present invention offer the advantage that they exhibit a markedly reduced susceptibility to the phenomenon known as thermal blocking during subsequent lamination to a resin core. Thermal blocking severely detracts from the appearance of the laminate and, along with a limited range of gloss, is a major disadvantage of metal plates having an exterior surface of PVDF paint.

The fact that the present coated metal sheets exhibit a reduced susceptibility to thermal blocking is an unexpected result. There is nothing previously known which would suggest that covering a cured PVDF paint on a metal substrate with a cured layer of a FEVE paint would prevent the PVDF paint from undergoing thermal blocking. The reduced susceptibility to thermal blocking exhibited by the present coated metal sheets is especially surprising in view of the fact that the laminates of the present invention are formed by a process in which the heat used to heat the metal substrate, adhesive film, and resin core is supplied by the lamination rollers. Thus, the PVDF paint layer is exposed to a high level of heat when the present metal sheets are laminated to a resin core but does not undergo thermal blocking.

Other features of the invention will become apparent in the course of the following descriptions of exemplary embodiments which are given for illustration of the invention and are not intended to be limiting thereof.

EXAMPLES

A coiled aluminum sheet, primed on one surface with a polyester primer and primed on the other surface with an epoxy primer, of thickness 0.5 mm was coated, on the surface primed with a polyester primer, with a PVDF paint (FLUROPON® Terracotta manufactured by Valspar) by die-roll coating and cured at 480° F. (peak metal temperature) with a one minute retention time. After cooling, the cured PVDF paint was coated with a FEVE paint (BONNFLON® Clear Coat manufactured by Asahi Glass Coat & Resin Co. Ltd.) again by die-roll coating. The FEVE paint was cured at 455° F. (peak metal temperature) with a retention time of one minute.

After cooling, two coils of aluminum sheet coated as described above were used to laminate a polyethylene resin sheet to obtain a composite laminate with one aluminum sheet laminated on each face of the resin sheet. The aluminum sheets were laminated to the resin sheet by means of an adhesive film disposed between each aluminum sheet and the resin sheet. The adhesive film was a double-layered adhesive laminate of (i) a low density polyethylene (thickness: 10 μm) modified by grafting 500 ppm of maleic anhydride and (ii) a non-modified low density polyethylene (thickness: 30 μm), as described in Example 1 of U.S. Pat. No. 4,994,130.

The laminate was prepared using the apparatus shown in FIG. 2. The coated metal sheets were preheated to 380° F.

The polyethylene sheet was laminated at 130° F. The lamination was carried out at a temperature of 390° F. (roller temperature) and a pressure of 1,000 psi. The thus-obtained laminate had the following characteristics and properties.

| 1) | thickness of PVDF | 0.9 mils |
|---|---|---|
|  | thickness of FEVE | 0.6 mils |
| 2) | adhesion (cross hatch) | 100/100 |
| 3) | MEK rubbing test | more than 100 times |
| 4) | reverse impact test | OK |
| 5) | Blocking | No appearance |
| 6) | QUV test (2000 Hrs) | No change |

The adhesion (cross hatch) was measured by ASTM D3359. The MEK rubbing test was carried out in accordance with NCCA No. II-18. The reverse impact test was carried out according to ASTM D2794. The appearance of blocking was evaluated by visual inspection. The QUV test was performed in accordance with ASTM G5388.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A coated metal sheet, comprising:
   (a) a metal substrate;
   (b) a layer of a cured polyvinylidene fluoride paint produced by heat curing a polyvinylidene fluoride paint, wherein said polyvinylidene fluoride paint comprises a polyvinylidene fluoride, a hardening agent, and a pigment, coated on a surface of said metal substrate; and (c) a layer of a cured fluorinated ethylene vinyl ether paint produced by heat curing a fluorinated ethylene vinyl ether paint, wherein said fluorinated ethylene vinyl ether paint comprises a fluorinated ethylene vinyl ether and a curing agent, coated on said layer of cured polyvinylidene fluoride paint (b).

2. The coated metal sheet of claim 1, wherein said metal substrate is selected from the group consisting of aluminum, iron, copper, tin, and steel.

3. The coated metal sheet of claim 1, wherein said metal substrate is aluminum.

4. The coated metal sheet of claim 1, wherein said metal substrate has a thickness of 0.01 to 2 mm.

5. The coated metal sheet of claim 1, wherein said layer of cured polyvinylidene fluoride paint has a thickness of 1 to 40 μm.

6. The coated metal sheet of claim 1, wherein said layer of cured fluorinated ethylene vinyl ether paint has a thickness of 1 to 40 μm.

7. The coated metal sheet of claim 1, wherein said layer of cured fluorinated ethylene vinyl ether paint further comprises a pigment.

8. The coated metal sheet of claim 1, having a gloss ranging from 25 to 80%.

9. A metal-resin composite laminate, comprising:

(1) a resin sheet; and (2) a coated metal sheet laminated on a first surface of said resin sheet;

wherein said coated metal sheet comprises:

(a) a metal substrate;

(b) a layer of a cured polyvinylidene fluoride paint produced by heat curing a polyvinylidene fluoride paint, wherein said polyvinylidene fluoride paint comprises a polyvinylidene fluoride, a hardening agent, and a pigment, coated on the surface of said metal substrate opposite the resin sheet; and (c) a layer of a cured fluorinated ethylene vinyl ether paint produced by heat curing a fluorinated ethylene vinyl ether paint, wherein said fluorinated ethylene vinyl ether paint comprises a fluorinated ethylene vinyl ether and a curing agent, coated on said layer of cured polyvinylidene fluoride paint (b).

10. The laminate of claim 9, wherein said metal sheet is selected from the group consisting of aluminum, iron, copper, tin, and steel.

11. The laminate of claim 9, wherein said metal sheet is aluminum.

12. The laminate of claim 9, wherein said metal sheet has a thickness of 0.01 to 2 mm.

13. The laminate of claim 9, wherein said layer of cured polyvinylidene fluoride paint has a thickness of 1 to 40 μm.

14. The laminate of claim 9, wherein said layer of cured fluorinated ethylene vinyl ether paint has a thickness of 1 to 40 μm.

15. The laminate of claim 9, wherein said resin sheet has a thickness of 1 to 10 mm.

16. The laminate of claim 9, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

17. The laminate of claim 9, wherein said resin sheet comprises polyethylene.

18. The laminate of claim 9, wherein said resin sheet further comprises 0.05 to 0.4 wt. % of carbon black, based on the total weight of said resin sheet.

19. The laminate of claim 9, wherein said metal sheet is laminated to said resin sheet by means of an adhesive film.

20. The laminate of claim 9, further comprising a second coated metal sheet laminated on a second surface of said resin sheet.

21. The laminate of claim 9, wherein said cured fluorinated ethylene vinyl ether paint further comprises a pigment.

* * * * *